United States Patent
Martin

(10) Patent No.: US 8,550,263 B2
(45) Date of Patent: Oct. 8, 2013

(54) MODULAR RACK SYSTEM

(76) Inventor: Jack Martin, Aberdeen, NJ (US)

( * ) Notice: Subject to any disclaimer, the term of this patent is extended or adjusted under 35 U.S.C. 154(b) by 24 days.

(21) Appl. No.: 13/134,254

(22) Filed: Jun. 2, 2011

(65) Prior Publication Data

US 2012/0305510 A1   Dec. 6, 2012

(51) Int. Cl.
*A47B 73/00* (2006.01)
*A47H 1/08* (2006.01)
*A47H 1/00* (2006.01)
*A47K 10/04* (2006.01)
*A47F 5/00* (2006.01)
*A47F 5/08* (2006.01)

(52) U.S. Cl.
USPC .......... 211/75; 211/105.3; 211/123; 211/175; 211/88.04

(58) Field of Classification Search
USPC ................. 211/6, 7, 8, 16, 123, 181.1, 105.1, 211/105.2, 204, 206, 113, 106.011, 87.01, 211/94.01, 88.04, 175, 75, 85.29, 153, 211/90.01, 90.02; 248/51, 298.1, 407, 248/200.1
See application file for complete search history.

(56) References Cited

U.S. PATENT DOCUMENTS

| 951,832 | A |   | 3/1910 | McMahon | |
|---|---|---|---|---|---|
| 1,002,063 | A |   | 8/1911 | Jasper | |
| 1,409,056 | A |   | 3/1922 | Michaels | |
| 1,580,847 | A | * | 4/1926 | Moineau | 248/302 |
| 1,687,383 | A | * | 10/1928 | O'Neil | 108/28 |
| 2,014,745 | A | * | 9/1935 | Regli | 108/11 |
| 2,504,319 | A |   | 4/1950 | Freeman | |
| 2,584,644 | A | * | 2/1952 | Verdi | 211/65 |
| 2,594,605 | A | * | 4/1952 | Zoppelt | 211/123 |
| 2,622,743 | A |   | 12/1952 | Ross | |
| 2,640,671 | A |   | 6/1953 | Grady | |
| 2,647,644 | A | * | 8/1953 | Cieslik | 211/105.6 |
| 2,653,718 | A |   | 9/1953 | Woodward | |
| 2,655,268 | A |   | 10/1953 | Whaley | |
| 2,825,469 | A |   | 4/1955 | Watkins et al. | |
| 3,096,731 | A | * | 7/1963 | Lehman | 108/29 |
| 3,104,014 | A | * | 9/1963 | Piette | 211/123 |
| 3,214,031 | A | * | 10/1965 | McCauley | 211/41.2 |
| 3,233,744 | A | * | 2/1966 | Ripps | 211/119.009 |
| 3,295,470 | A | * | 1/1967 | Johnson | 108/47 |
| 3,799,071 | A | * | 3/1974 | Gerlach | 108/46 |
| 3,955,826 | A | * | 5/1976 | Riedesel | 280/35 |
| 4,036,369 | A | * | 7/1977 | Eisenberg | 211/88.02 |
| D274,486 | S | * | 7/1984 | Thompson | D6/525 |
| 4,465,198 | A |   | 8/1984 | Martin | |
| 4,754,504 | A | * | 7/1988 | Cellini | 4/610 |
| 4,936,536 | A | * | 6/1990 | Meneghello | 248/309.1 |
| 5,082,125 | A | * | 1/1992 | Ninni | 211/184 |
| 5,137,158 | A | * | 8/1992 | Brockway | 211/106.01 |
| 5,875,902 | A | * | 3/1999 | Emery et al. | 211/90.03 |
| 7,523,900 | B1 | * | 4/2009 | Hlatky | 248/201 |
| 7,798,341 | B2 | * | 9/2010 | Richardson et al. | 211/119 |
| 7,900,782 | B2 | * | 3/2011 | Goserud et al. | 211/85.29 |

* cited by examiner

*Primary Examiner* — Darnell Jayne
*Assistant Examiner* — Kimberley S Wright
(74) *Attorney, Agent, or Firm* — Peter A. Luccarelli, Jr.

(57) ABSTRACT

A modular rack and kit of parts for constructing a modular rack may be dimensioned to vary width and depth for different applications in different rooms. Retention accessories, including article hooks, extension cross members and shelves, each have attachment portions with mating cross-sectional profiles corresponding to the rack members engage the rack members circumferentially. The retention accessories are selectively reconfigurable for evolving storage needs.

15 Claims, 6 Drawing Sheets

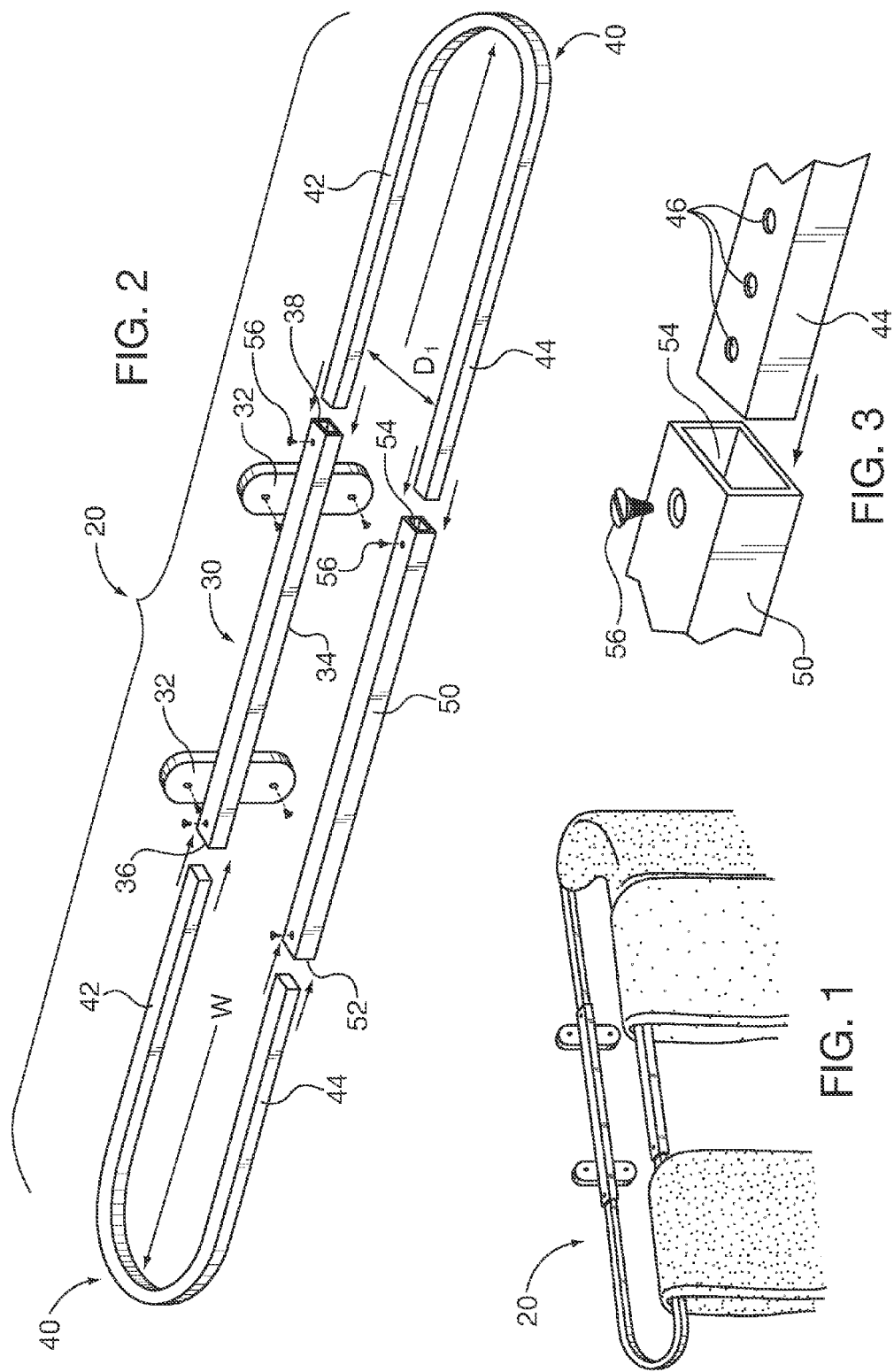

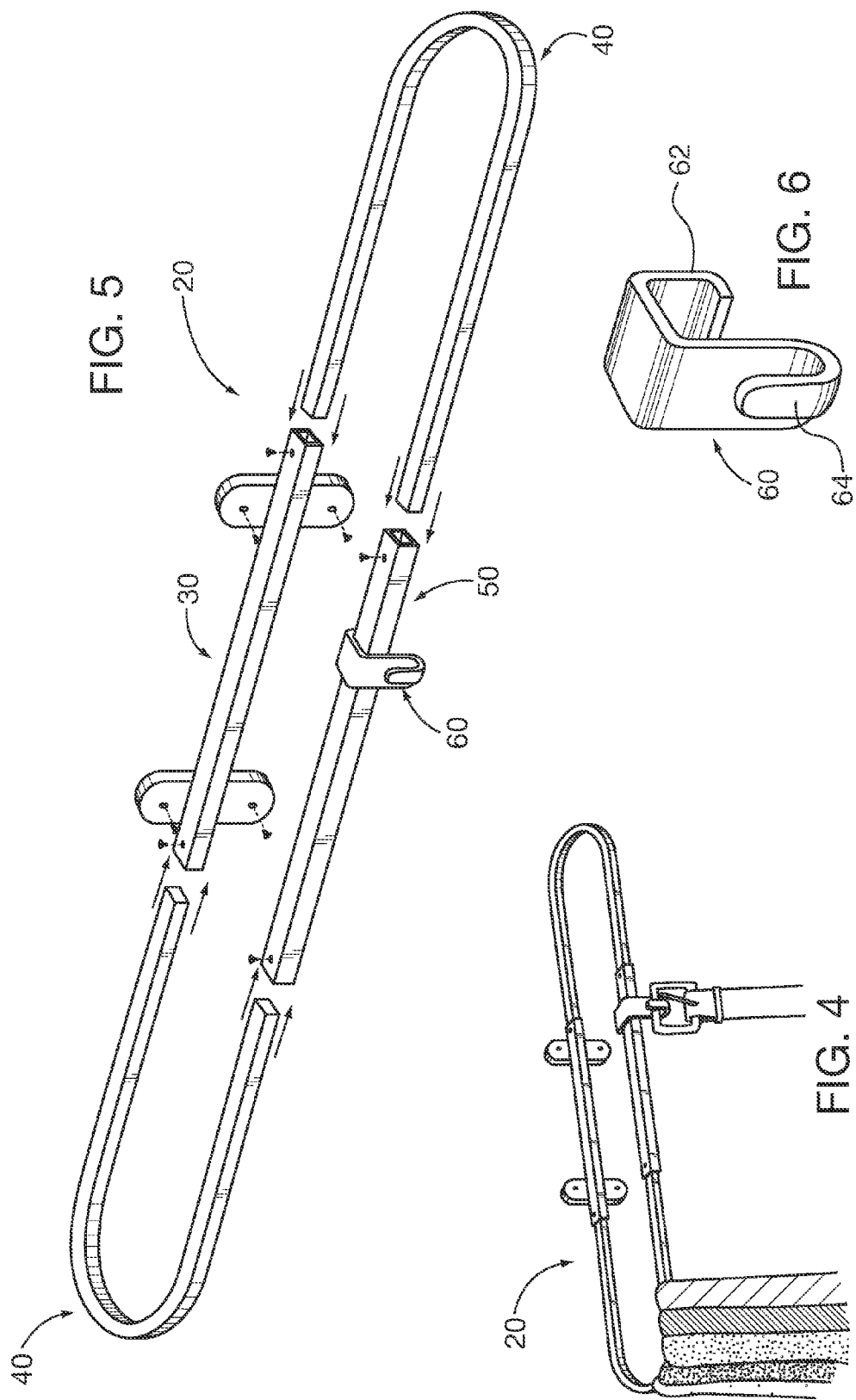

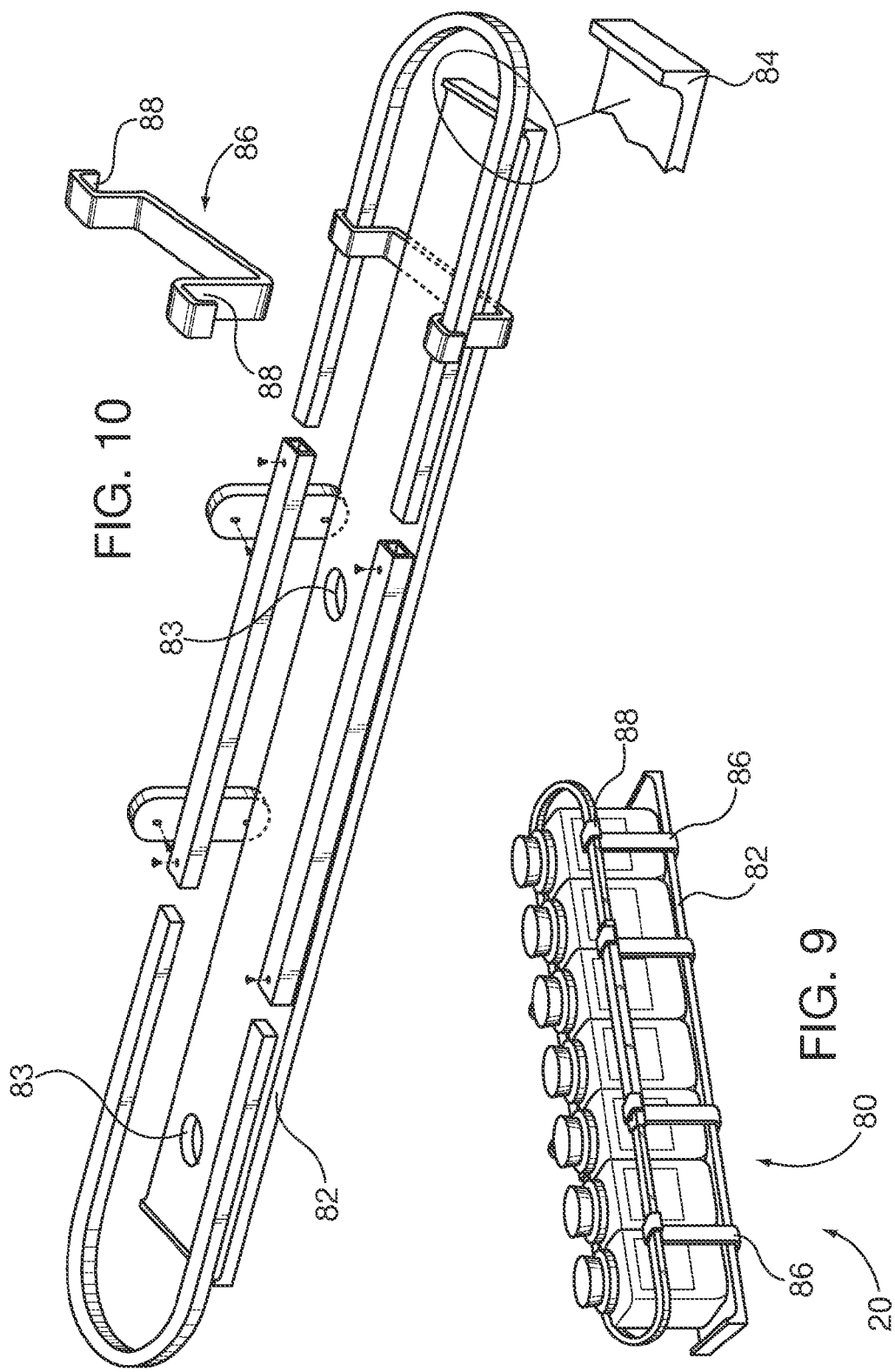

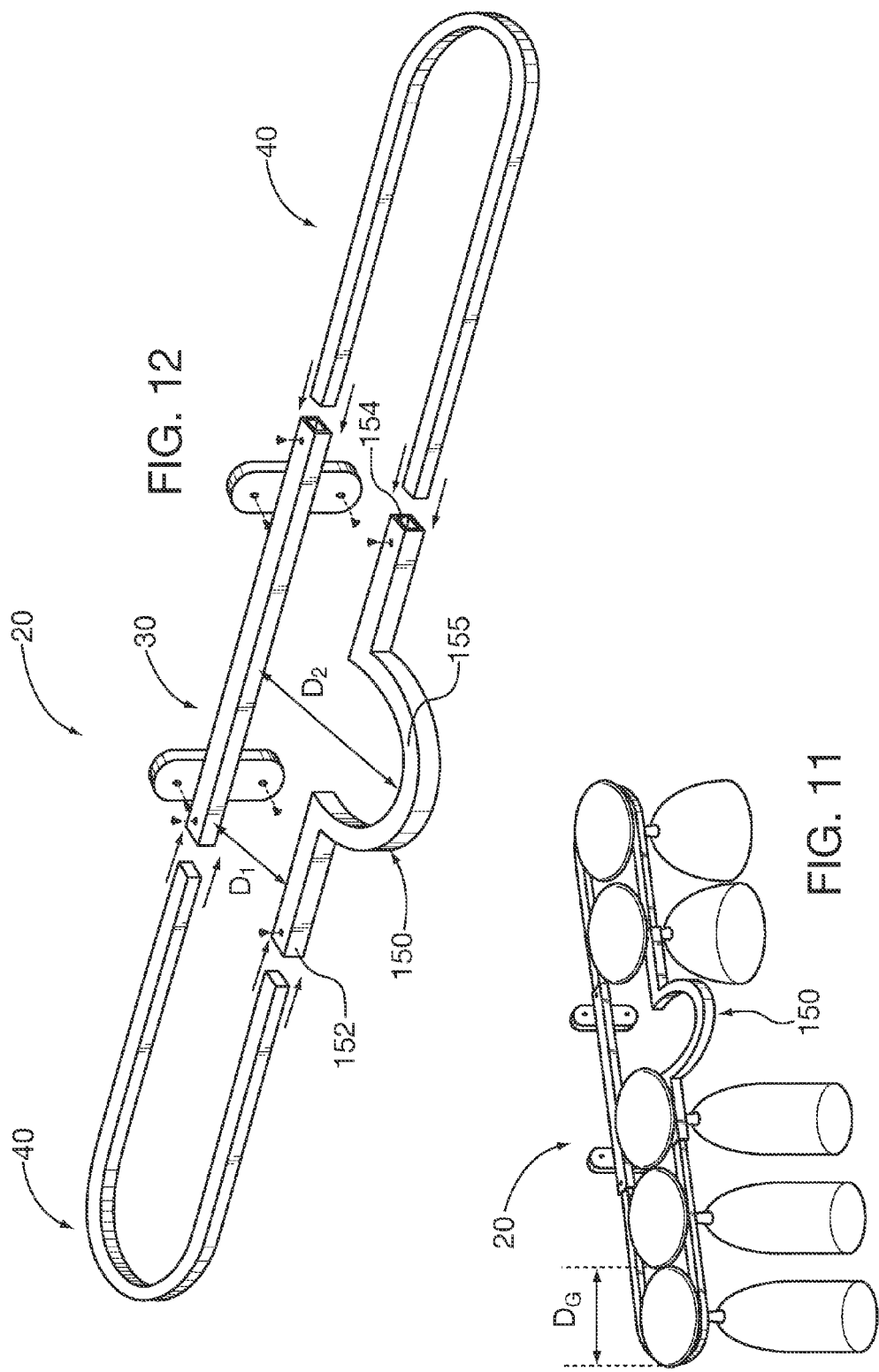

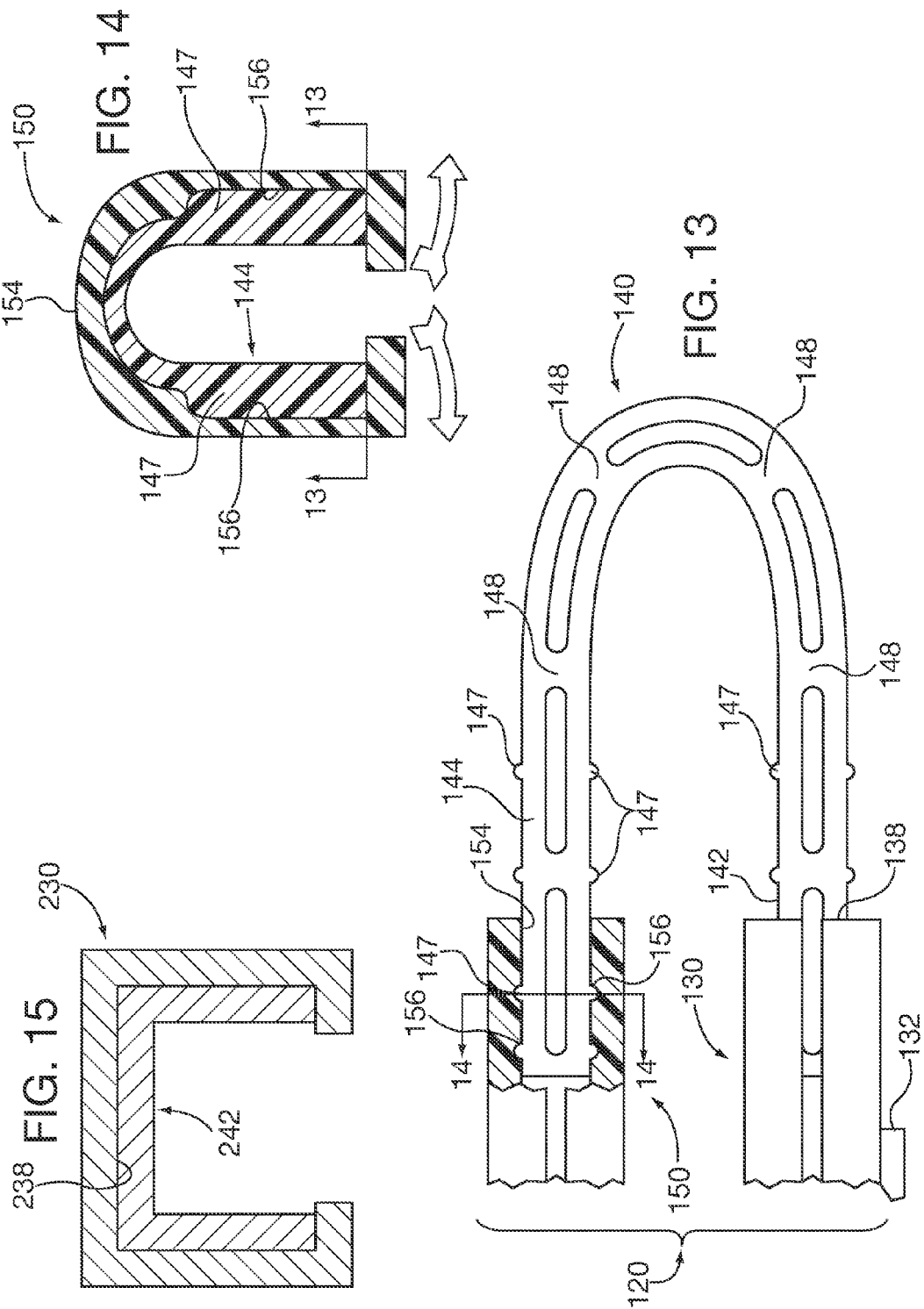

MODULAR RACK SYSTEM

BACKGROUND OF THE DISCLOSURE

1. Field of the Invention

The invention relates to racks for hanging objects, such as towels, ties, belts and jars, and in particular to a modular rack and kit of parts capable of being reconfigured for a variety of applications in a home, hotel or other commercial facility.

2. Description of the Prior Art

My prior invention, U.S. Pat. No. 4,465,198, issued Aug. 14, 1984, was directed to an expandable towel rack having telescoping ends for adjusting rack width to desired dimensions. The entire contents of U.S. Pat. No. 4,465,198 is incorporated herein by reference.

Homes, hotels and other commercial facilities often employ different types of mounted racks that are dedicated to specific applications. For example, bathrooms often require towel racks, garment racks, toiletry racks/shelves for cosmetics, drinking glasses, razors, tooth brushes and the like. Bedroom clothing closets often have tie, scarf and belt racks. Kitchens often require towel, spice and knife racks. Garages and utility rooms often require racks for hanging tools, containers holding nails and screws and the like. Each different application in different rooms often requires purchase of separate dedicated racks due to dimensional requirements and their intended application. For example, a garment hanger will need hooks to secure belts or hang hats. A kitchen spice rack needs capacity to hold spice jars, bottles, and other types of vessels securely. Bathroom cosmetic racks may need open shelves capable of holding a variety of cosmetic and grooming objects suitable to the user, with peripheral bumpers to prevent objects from inadvertently falling off the shelf.

An individual homeowner may not be unduly burdened by purchasing different application specific storage racks when occasionally remodeling a household room. Conversely, building developer or commercial complex manager is more likely to be inconvenienced by the need to purchase inventories of different application specific storage racks when building or remodeling a large housing development, apartment complex or hotel.

Thus, a need exists in the art for a modular rack system capable of being configured for different applications and dimensions during manufacture or in the field, so as to reduce application specific inventory.

Another need exists in the art for a modular rack system capable of being configured for different applications and dimensions from a kit of common parts.

SUMMARY OF THE INVENTION

Accordingly, an object of the invention is to create a modular rack system capable of being configured for different applications and dimensions during manufacture or in the field, from a kit of common modular parts.

This and other objects are achieved in accordance with the present invention by the modular rack system, configurable from a kit of common parts, that enables a contractor or end user to construct or reconfigure a rack to meet the needs of different storage applications in different rooms. Rack size may be varied selectively by expanding or reducing projection of return members on the ends of the rack, such as by telescopically sliding the return members relative to the rack mounting member and cross member, and locking their relative positions. Retention accessories for different applications, such as article hooks, shelves and extension cross members engage the rack member circumference.

Thus the same basic rack may be configured for different applications in bathrooms, kitchens, bedrooms and utility rooms by adjusting the rack length and adding retention accessories needed to suit the application. For example, the modular rack in a bathroom may be used to hold towels. Another rack in the same bathroom may be configured with a toiletry shelf. Yet another rack may include a shelf having apertures for retention of drinking glasses, tooth brushes, razors and the like. Any or all of the retention accessories can be combined in a single rack or a plurality of rack combinations. Similarly, one or more of the same modular racks may be configured to hold towels, knives and other cooking utensils, hanging pots, spice bottles, cleaning liquids or the like.

The present invention features a modular rack system comprising a mounting member, for affixation to a surface, such as a wall or cabinet, having opposed first and second coupling members each having non-circular cross-sectional profiles. First and second return members that respectively have elongated first and second legs are received by a corresponding one of the first or second coupling members and project outwardly from its respective coupling member. Projection length may be varied selectively to change the rack dimensional width. Projection depth away from the mounting surface may be varied by selecting different returns constructed with a desired gap between the legs. The legs have non-circular cross-sectional profiles matching that if its respective coupling member. A cross member, having opposed third and fourth coupling members, each having non-circular cross-sectional profiles matching that of a corresponding second leg receives the that leg, to complete a closed structural loop. Retention mechanisms rigidly affix respective coupling members and corresponding legs to desired dimensional projection lengths. At least one retention accessory selected from the group consisting of article hooks, extension cross members and shelves, has an attachment portion with a mating cross-sectional profile corresponding to at least one of the members, for circumferential engagement thereabout.

The present invention also features a kit of parts that are configurable to create modular racks as described above, meeting different specific applications within one or more rooms.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 1 is a perspective view of the modular rack system of the present invention configured as a towel rack;

FIG. 2 is an exploded perspective view of the rack of FIG. 1;

FIG. 3 is a detailed view of FIG. 1;

FIG. 4 is a perspective view of the modular rack system of the present invention configured as a garment rack;

FIG. 5 is an exploded perspective view of the rack of FIG. 4 showing a retention accessory hook installed thereon;

FIG. 6 is a perspective view of the retention accessory hook of FIG. 5;

FIG. 9 is a perspective view of the modular rack system of the present invention configured as another shelving unit, with another embodiment of retention accessory shelf installed thereon;

FIG. 10 is an exploded perspective view of the retention accessory shelf of FIG. 9, with a recessed shelf suspended on attachment portions;

FIG. 11 is a perspective view of the modular rack system of the present invention configured as a stemmed glass storage unit with an extension cross member installed thereon;

FIG. 12 is an exploded perspective view of the extension cross member of FIG. 11 substituted for the cross member shown in FIG. 1, that facilitates receipt of a stemmed glass;

FIG. 13 is a partially exploded bottom plan view of an alternative embodiment of the present invention rack members;

FIG. 14 is an elevational cross-section of the embodiment of FIG. 13, taken along line 14-14 thereof; and FIG. 15 is an elevational cross-section of another embodiment of the present invention rack members similar to that of FIG. 14.

To facilitate understanding, identical reference numerals have been used, where possible, to designate identical elements that are common to the figures.

DETAILED DESCRIPTION

Figure 7:
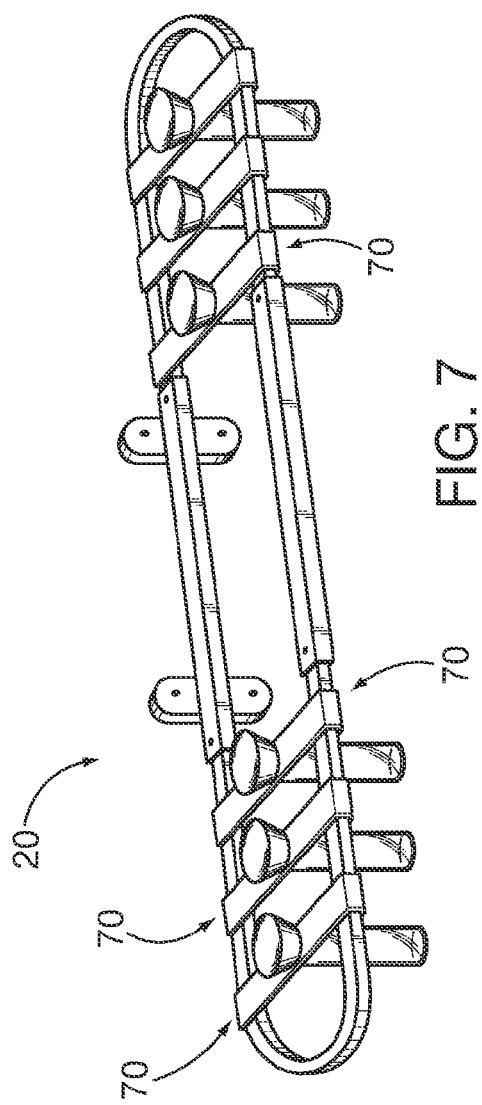
FIG. 7 is a perspective view of the modular rack system of the present invention configured as a shelving unit with a retention accessory shelf installed thereon.

After considering the following description, those skilled in the art will clearly realize that the teachings of my invention can be readily utilized in modular rack systems and kits for modular rack systems that enable an installer to configure a rack for many different applications.

FIGS. 1-3 show the rack 20 of the present invention configured as a towel holding rack. The rack 20 has a mounting members 30 for affixation to a surface, such as a wall or a cabinet (not shown), with mounting flanges 32 that receive screws or other known fasteners. The number of mounting flanges 32 and their dimensions can be configured as desired for one or more specific or general applications, including intended weight bearing specifications. The mounting member 30 has a central mounting portion 34 defining opposed first and second ends 36, 38, that are shown as having hollow tubular profiles. The mounting portion 34 couples to the return members 140 by mating the first and second coupler ends 36, 38 to respective elongated first legs 42 of each of the return members.

The return members 40 each have second elongated legs 44 that as shown are generally parallel to the first legs 42. The second legs 44 mate with and are coupled to cross member 50 by way of the third and fourth coupler ends 52, 54. As shown, the coupled return members 40, mounting member 30, and cross member 50 form a generally planar closed loop, but the loop may be configured in any three dimensional profile, and may include open loop portions. Rack width dimension W is selectively adjustable by varying telescoping projection of the return members 40 relative to the central mounting portion 34 and cross member 50. Projection from either the left or right ends 36, 38 of the central mounting portion 34 may be symmetrical or asymmetrical as desired for any specific application. Once rack width W is configured, the dimension may be fixed with retention mechanisms, such as with screws 56 that may be tensioned in compression against one or both of the return member legs 42, 44 or screwed through a leg by way of apertures 46 preformed therein or subsequently drilled during rack assembly. The screws 56 may be subsequently removed and reinstalled so that rack width W may be varied in the future. Other fasteners, such as pins, rivets, adhesives or formed-in-place interlocking components may be utilized as retention mechanisms.

As shown, the members 34, 40 and 50 have non-circular cross-sections to prevent relative rotation and provide additional torsional stiffness to the assembled rack 20. The members may be constructed of any desired material, such as metal or plastic with any desired surface finish. However, a circular profile may be utilized if another structure, such as a through pin or key inhibits relative anti-rotation and enhances rotational stiffness. Rack member 30, 40, 50 component profiles, thickness and dimensions may be configured as desired by those skilled in the art to meet intended load and other specifications. For example, the return member legs 42, 44 may be configured in different length ranges for different applications. Rack depth $D_1$ may be varied by configuring return members 40 with different spacing ranges $D_1$. While for cost reduction and ease of assembly the return member 40 legs 42, 44 and coupling member ends 36, 38, 52, 54 all have the same cross-sectional profile, the dimensions may be varied for each mating pair of coupled telescoping connection, or varied along the length of each component, for example for structural integrity or aesthetic appearance. Similarly, telescoping coupled connections may be reversed, so that mounting member 30 and/or cross member 50 is captured within its respective leg 42, 44.

FIGS. 4-6 show the rack 20 of the present invention configured as a garment rack for holding ties, belts, scarves, hats, coats or the like. Retention accessory hook 60 facilitates hanging of belts, hats and coats. The accessory hook 60 has an attachment portion 62 that is profiled to engage circumferentially around and snap over one of the members 30, 40, 50. A hook portion 62 projects away from the rack for hanging of garments and other articles. For example the rack with accessory hooks 60 may be utilized to hang tools, cooking pots, picture frames or other articles.

Figure 8:
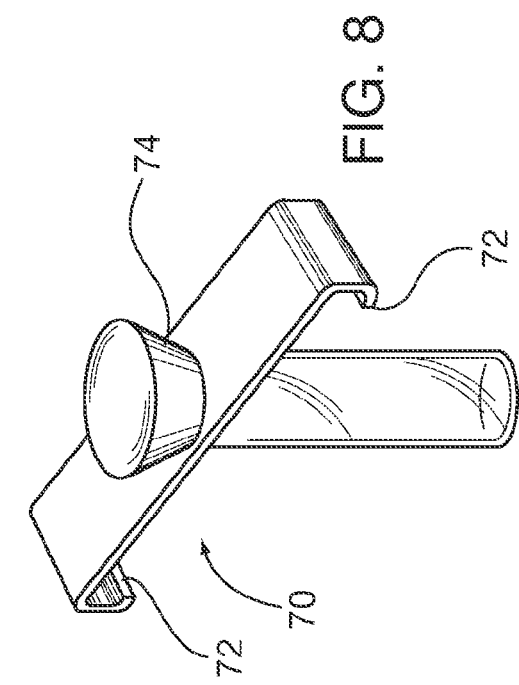
FIG. 8 is a perspective view of the retention accessory shelf of FIG. 7, with apertures for receipt of storage vessels.

FIGS. 7 and 8 show the rack 20 of the present invention configured as a shelf having formed apertures for retention of articles. Shelf 70 has a pair of opposed attachment portions 72 for spanning the rack loop and snapping over opposed sides of the members forming the rack. The shelf 70 defines apertures for receipt of articles such as bottles, shown. The apertures may be configured in any number or dimension. While the shelves shown in FIG. 7 only retain a single article they may be constructed in other widths to accommodate different quantities and article dimensions, such as tooth brushes, screw drivers, flower vases and the like.

FIGS. 9 and 10 show the rack 20 of the present invention configured as a recessed shelf 80 oriented below the rack closed loop plane. Planar shelf 82 optionally has formed apertures 83 for retention of articles as shown in FIGS. 7 and 8 and may have one or more raised lips 84 about its perimeter for retention of articles resting on the shelf. Shelf 82 is suspended from shelf hooks 86 that have a central planar portion on opposite ends of which are coupled attachment portions 88 for engagement over the rack members. The shelf 82 is supported by the central planar portions, suspended within and peripherally bounded by the rack closed loop plane. Recessing shelf 82 also helps to retain articles resting on the shelf by having them abut laterally against the rack members.

FIGS. 11 and 12 show the rack 20 of the present invention configured as a stem glass holding rack by substitution of the straight cross member 15 with an extension cross member 150 having a bulbous projection 155 that has a fifth dimensional width or depth $D_2$ greater than the third dimensional width or depth $D_1$ and is oriented co-planar with the rest of the rack members. Depths are chosen so that $D_1$ is narrower than and $D_2$ is wider than the stem glass foot or base first dimensional width or diameter $D_G$. $D_1$ third dimensional width is less than the stemware base first dimensional width but greater than the stemware stem second dimensional width so that the base and stem are circumscribed by the loop portion third dimensional width $D_1$ and fourth dimensional width W, with the base resting on the loop portion.

FIGS. 13-15 show alternative embodiment constructions of the rack member component profiles. In FIGS. 13 and 14 the rack members 130, 140 and 150 are constructed of molded plastic and have non-tubular cross-sectional profiles. The mounting member 130 and cross member 150 are biased to separate the bottom open flanges in the direction of the double arrows shown in FIG. 14, so as to separate the side walls and allow insertion of the return members 140. Recesses 156 formed in the cross member engage protruding ribs 147 formed in the return member leg 144 for locking the projection width W of the rack 120. Similar structure is provided in the mounting member 130 and corresponding leg 142. Return members 140 have integrally formed reinforcing ribs 148, for structural rigidity. In FIG. 15 the mounting member 230 and corresponding coupled leg 242 have C-channel profiles and are constructed of stamped or extruded metal.

Although various embodiments which incorporate the teachings of the present invention have been shown and described in detail herein, those skilled in the art can readily devise many other varied embodiments that still incorporate these teachings.

What is claimed is:

1. A modular rack system for stemware having a base with a first dimensional width and a stem having a second dimensional width less than the first dimensional width, comprising:
    a mounting structural member, for affixation to a surface, having opposed first and second coupling members;
    first and second return structural members, respectively having:
        elongated opposed first and second legs that are oriented in mutually spaced relationship spanning a third dimensional width less than the first dimensional width and greater than the second dimensional width;
        each respective first leg coupled to a corresponding one of the first or second coupling members and projecting outwardly therefrom a desired distance, for selectively varying assembled rack system fourth dimensional width;
    an extension cross structural member, having:
        opposed third and fourth coupling members for receiving a corresponding one of the second legs of the first or second returns, so that the assembled structural members form a closed loop with opposed sides spanning the third dimensional width; and
        a bulbous projection extending outwardly from the closed loop along a common plane, spanning with an opposed side of the loop a fifth dimensional width that is greater than the first dimensional width, for receipt, circumscribed passage and capture of stemware bases therein, so that the stemware bases are suspended within and peripherally supported by the closed loop; and
    retention mechanisms for rigidly affixing respective coupling members and corresponding received legs.

2. The rack system of claim 1, further comprising at least one retention accessory selected from the group consisting of article hooks and shelves, each accessory having an attachment portion with a mating cross-sectional profile corresponding to at least one of the structural members, for circumferential snap fit engagement thereabout.

3. The rack system of claim 2, wherein the retention accessory further comprises an accessory hook that projects outwardly from the closed loop.

4. The rack system of claim 2, wherein the retention accessory further comprises:
    a shelf spanning the first and second legs of at least one of the return structural members; and
    a pair of opposed attachment portions on opposite ends of the shelf having attachment hooks that clip around a portion of a respective leg outer circumference.

5. The rack system of claim 4, wherein the shelf defines apertures for receipt of articles therein.

6. The rack system of claim 4, wherein the shelf is oriented on a plane parallel to and offset from a plane defined by the closed loop formed by the structural members.

7. The rack system of claim 1, wherein the coupling members and the legs have a tubular profile and are coupled to each other by sliding telescopic engagement.

8. The rack system of claim 1, wherein at least one of the legs defines internal structural reinforcement ribs.

9. A kit of parts including the parts which are to be assembled into the rack system of claim 1, and further comprising a plurality of extension cross structural members respectively having differently dimensioned bulbous projections for selectively varying the fifth dimensional width when assembled with other structural members to form the closed loop.

10. A modular rack system for constructing shelving, comprising:
    a mounting structural member, for affixation to a surface, having opposed first and second coupling members;
    first and second return structural members, respectively having elongated opposed first and second legs, each respective first leg coupled to a corresponding one of the first or second coupling members and projecting outwardly therefrom a desired distance, for selectively varying assembled rack system first dimensional width;
    a cross structural member, having opposed third and fourth coupling members for receiving a corresponding one of the second legs of the first or second returns, so that the assembled structural members form a closed loop with the opposed first and second legs spanning a second dimensional width;
    retention mechanisms for rigidly affixing respective coupling members and corresponding received legs;
    a shelf suspended on a plane parallel to and below a plane defined by the first and second legs of at least one of the return structural members, the shelf having a periphery that is circumscribed by said at least one return structural member; and
    a pair of opposed attachment portions coupled to opposite ends of the shelf having a central planar portion on opposite ends of which are coupled attachment hooks that clip around a portion of a respective leg outer circumference, so that the shelf is supported by the central planar portions, suspended within and peripherally bounded by the at least one return structural member.

11. The rack system of claim 10, further comprising at least one retention accessory selected from the group consisting of article hooks and shelves, each accessory having an attachment portion with a mating cross-sectional profile corresponding to at least one of the structural members, for circumferential snap fit engagement thereabout.

12. The rack system of claim 11, wherein the retention accessory further comprises an accessory hook that projects outwardly from the closed loop.

13. The rack system of claim 10, wherein the shelf defines apertures for receipt of articles therein.

14. The kit of claim 10, wherein at least one of the legs defines internal structural reinforcement ribs.

15. A kit of parts including the parts which are to be assembled into the rack system of claim 10, and further comprising:
- a plurality of shelves respectively having differently dimensioned peripheries; and
- a plurality of first and second return structural members respectively having differently dimensioned opposed first and second legs for selectively varying the first or second dimensional widths when assembled with other structural members to form the closed loop.

* * * * *